United States Patent
Bevan et al.

(10) Patent No.: US 7,186,978 B2
(45) Date of Patent: Mar. 6, 2007

(54) COMPACT EMISSIVITY AND TEMPERATURE MEASURING INFRARED DETECTOR

(75) Inventors: Edward James Bevan, Cambria, CA (US); Max Michael Briggs, Palo Alto, CA (US); John DiDomenico, Tuscon, AZ (US); Robert W. Gedridge, Jr., Lusby, MD (US)

(73) Assignee: Millennium Enginerring and Integration Company, Arlington, VA (US)

( * ) Notice: Subject to any disclaimer, the term of this patent is extended or adjusted under 35 U.S.C. 154(b) by 0 days.

(21) Appl. No.: 10/967,010

(22) Filed: Oct. 15, 2004

(65) Prior Publication Data

US 2006/0081777 A1    Apr. 20, 2006

(51) Int. Cl.
*H04N 5/217* (2006.01)

(52) U.S. Cl. ..................... 250/330; 250/332

(58) Field of Classification Search ............... 250/330, 250/332
See application file for complete search history.

(56) References Cited

U.S. PATENT DOCUMENTS

| | | | | |
|---|---|---|---|---|
| 4,215,275 A | * | 7/1980 | Wickersheim | 374/137 |
| 4,280,050 A | * | 7/1981 | Callender et al. | 250/330 |
| 4,659,234 A | | 4/1987 | Brouwer et al. | 374/121 |
| 4,868,768 A | | 9/1989 | Draggoo et al. | 364/525 |
| 4,974,182 A | | 11/1990 | Tank | 364/557 |
| 4,979,134 A | | 12/1990 | Arima et al. | 364/557 |
| 4,986,672 A | | 1/1991 | Beynon | 374/131 |
| 5,011,295 A | | 4/1991 | Krishnan et al. | 374/126 |
| 5,094,544 A | | 3/1992 | Ignatowicz | 374/126 |
| 5,114,242 A | | 5/1992 | Gat et al. | 374/128 |
| 5,165,791 A | | 11/1992 | Miki et al. | 374/9 |
| 5,219,226 A | | 6/1993 | James | 374/124 |
| 5,235,399 A | | 8/1993 | Usui et al. | 356/45 |
| 5,272,340 A | | 12/1993 | Anbar | 250/332 |
| 5,323,334 A | | 6/1994 | Meyers et al. | 364/571.05 |
| 5,388,907 A | | 2/1995 | Aoyama et al. | 374/130 |
| 5,390,228 A | | 2/1995 | Niibe et al. | 378/34 |
| 5,460,451 A | | 10/1995 | Wadman | 374/126 |
| 5,463,464 A | | 10/1995 | Ladewski | 356/376 |
| 5,490,728 A | | 2/1996 | Schietinger et al. | 374/7 |
| 5,818,951 A | | 10/1998 | Schivley | 382/100 |
| 5,822,222 A | | 10/1998 | Kaplinsky et al. | 364/557 |
| 5,868,496 A | | 2/1999 | Spitzberg | 374/128 |
| 5,878,163 A | | 3/1999 | Stephan et al. | 382/172 |
| 6,018,587 A | * | 1/2000 | Cabib | 382/165 |
| 6,023,061 A | * | 2/2000 | Bodkin | 250/332 |
| 6,031,233 A | | 2/2000 | Levin et al. | 250/339.11 |
| 6,069,357 A | | 5/2000 | Caron et al. | 250/334 |
| 6,142,663 A | | 11/2000 | Takasuka | 374/121 |

(Continued)

*Primary Examiner*—Otilia Gabor
(74) *Attorney, Agent, or Firm*—Whiteford, Taylor & Preston LLP; Jeffrey C. Maynard

(57) ABSTRACT

A hand-held, fleet deployable infrared camera with integrated hardware and software providing real time processing of infrared images. The camera senses variable temperature images over a selected object of interest and senses variable emissivities over the object. The camera also measures and corrects for reflected environmental radiation as well as corrections for the atmospheric path through which the object is viewed. A calibrated reference patch having known emissivity and reflectance is attached to an object of interest and viewed through the camera. The calibrated patch is used to provide correction for the environmental radiation reflected off the object. Once the environmental radiation correction is known, it can be used to correct measurements taken from the rest of the object of interest.

20 Claims, 10 Drawing Sheets

U.S. PATENT DOCUMENTS

| | | |
|---|---|---|
| 6,168,311 B1 | 1/2001 | Xiao et al. .................. 374/161 |
| 6,269,186 B1 | 7/2001 | Makita ....................... 382/172 |
| 6,379,038 B1 | 4/2002 | Felice ........................ 374/128 |
| 6,488,407 B1 | 12/2002 | Kitamura et al. ........... 374/126 |
| 6,515,285 B1 | 2/2003 | Marshall et al. ............ 250/352 |
| 6,591,021 B1 | 7/2003 | Breiter et al. ............... 382/274 |
| 6,690,011 B2 | 2/2004 | Watanabe et al. ........... 250/330 |
| 6,756,592 B1 * | 6/2004 | Smith et al. .............. 250/338.5 |
| 6,853,452 B1 * | 2/2005 | Laufer ........................ 356/436 |
| 2002/0117621 A1 | 8/2002 | Nakamura et al. .......... 250/330 |
| 2002/0126732 A1 | 9/2002 | Shakouri et al. ............ 374/130 |
| 2003/0091090 A1 | 5/2003 | Schieferdecker et al. ... 374/120 |
| 2003/0123518 A1 | 7/2003 | Abbasi et al. .............. 374/124 |

* cited by examiner

COMPACT EMISSIVITY AND TEMPERATURE MEASURING INFRARED DETECTOR

GOVERNMENT LICENSE RIGHTS

This invention was made with Government support under SBIR contract N41756-03-C-1103 awarded by the Department of Defense. The Government has certain rights in the invention.

BACKGROUND OF THE INVENTION

1. Field of the Invention

The invention relates to a compact, man-portable, infrared camera that is usable in an operational military environment by military personnel. The camera uses two-color radiometric techniques to determine the emissivity and temperature images displaying the spatial distribution of temperature and emissivity for extended objects. The process includes corrections for the atmospheric path through which the object is being viewed and for the environmental radiance being reflected off the object. The camera is designed for the decoupling of the reflected and emitted radiation from the object and the direct solution for the emissivity.

2. Background of the Invention

All surfaces emit thermal radiation. However, at any given temperature and wavelength, there is a maximum amount of radiation that any surface can emit. If a surface emits the maximum amount, it is known as a blackbody. A blackbody has an emissivity of 1.0 at all temperatures and wavelengths. Most surfaces are not blackbody emitters, and emit some fraction of the amount of thermal radiation that a blackbody would. Emissivity is the ratio of radiation emitted by a surface and the theoretical radiation predicted by Planck's law.

The problem to be solved is to develop a robust, hand-held infrared measurement device to evaluate the infrared characteristics of an object of interest, such as aircraft and other vehicles. There are currently available laboratory instruments capable of measuring emissivity. These instruments are large, difficult to operate, and require careful control of the laboratory environment. As such, they are unsuitable for robust, simple, and man-portable field operations. There are also satellite instruments that attempt to measure emissivity from orbital platforms. These devices have been deployed for many years. They typically use broadband radiometers and/or a collection of narrow band measurements. Often they also include some sort of ground truth measurement to support the space-based measurement. These instruments are again unsuitable for robust man-portable operations.

Field instruments do exist, however. One class of instruments normally attempts to measure emissivity by measuring reflectance and calculating the emissivity based on this measurement. Surface emissivity is measured indirectly by assuming that $\epsilon=1-$reflectivity. In general, a single energy bounce is measured and the reflected energy is measured. Typically, a large intensity laser is used as a radiation source and the strength of the reflected intensity is measured. This allows for the calculation of measured reflectance and hence resultant emissivity at the wavelength of the laser. These laser instruments can work adequately in radiation bands in which there is no emission, such as the visible band, but become problematic if thermal emission sources in the object being measured must compete with reflected laser intensities. These laser devices also suffer from the fact that they are inherently based on measurements at a single wavelength or, at best, a small number or wavelengths and they generally do not provide large field of view emissivity images of the object of interest.

Another class of field instruments for measuring emissivity contains single band radiometers. These unfortunately require knowledge of the surface temperature and again suffer from an inability to unravel reflected and emitted light from the source.

For example, U.S. Pat. No. 5,272,340 to Anbar shows an infrared imaging system for simultaneous generation of temperature, emissivity, and fluorescence images that determines temperature, reflectivity, and fluorescence of a surface. U.S. Pat. No. 5,868,496 to Spitzberg shows a method to calculate surface temperature from an object by measuring radiated energy in multiple wavelength bands. U.S. Pat. No. 4,659,234 to Brouwer et al. shows a method to correct emissivity readings for a radiation thermometer by measuring radiated energy at two wavelengths. U.S. Pat. No. 4,974,182 to Tank shows a method for measuring the emissivity and temperature of an object by successive determination of radiance in multiple wavelength bands.

Thus, although substantial effort has been devoted in the art heretofore towards development of methods to measure temperature and emissivity, there remains an unmet need for a robust device which is easier to use and which can be deployed to an operational military environment. Likewise, there remains an unmet need for a method to measure temperature and emissivity that corrects for atmospheric conditions and environmental radiance.

SUMMARY OF THE INVENTION

The present invention provides a hand-held, fleet deployable infrared device having a camera with integrated hardware and software providing real time processing of infrared images. The device measures and corrects for reflected environmental radiation from a selected object of interest and corrects for the atmospheric path through which the object is viewed. The device senses and displays variable temperature images over the object of interest. It also senses variable emissivities over the object. The output from the device is an image of the object of interest with representations of temperature and emissivity over the entire object of interest.

A calibrated reference patch having known emissivity and reflectance is attached to an object of interest and viewed through an infrared camera. The calibrated patch is used to provide correction for the environmental radiation reflected off the object. Once the environmental radiation correction is known, it can be used to correct additional measurements taken from the rest of the object of interest.

It is, therefore, an object of the present invention to enable an emissivity and temperature measuring infrared device that avoids the disadvantages of the prior art.

It is another object of the present invention to enable obtaining two-color radiometric image measurements. It is a related object of the present invention to define a system for removing reflected radiation, correcting for atmospheric path absorption, and calculating temperature and emissivity spatial distributions from two-color infrared image radiometric measurements.

It is another object of the instant invention to enable an emissivity detector that incorporates real-time image processing hardware and software. It is a related object of the instant invention to enable a device integrating an infrared camera, digital image processing hardware, range measurement, and a user interface into an easy-to-use, robust, hand-held system.

In accordance with the above objects, a robust, emissivity and temperature measuring device is disclosed. Some of the advantages of the device include a camera that can sense variable temperature images over an object, a camera that can sense variable emissivities over an object, and a system that can sense and correct for reflected environmental radiation.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
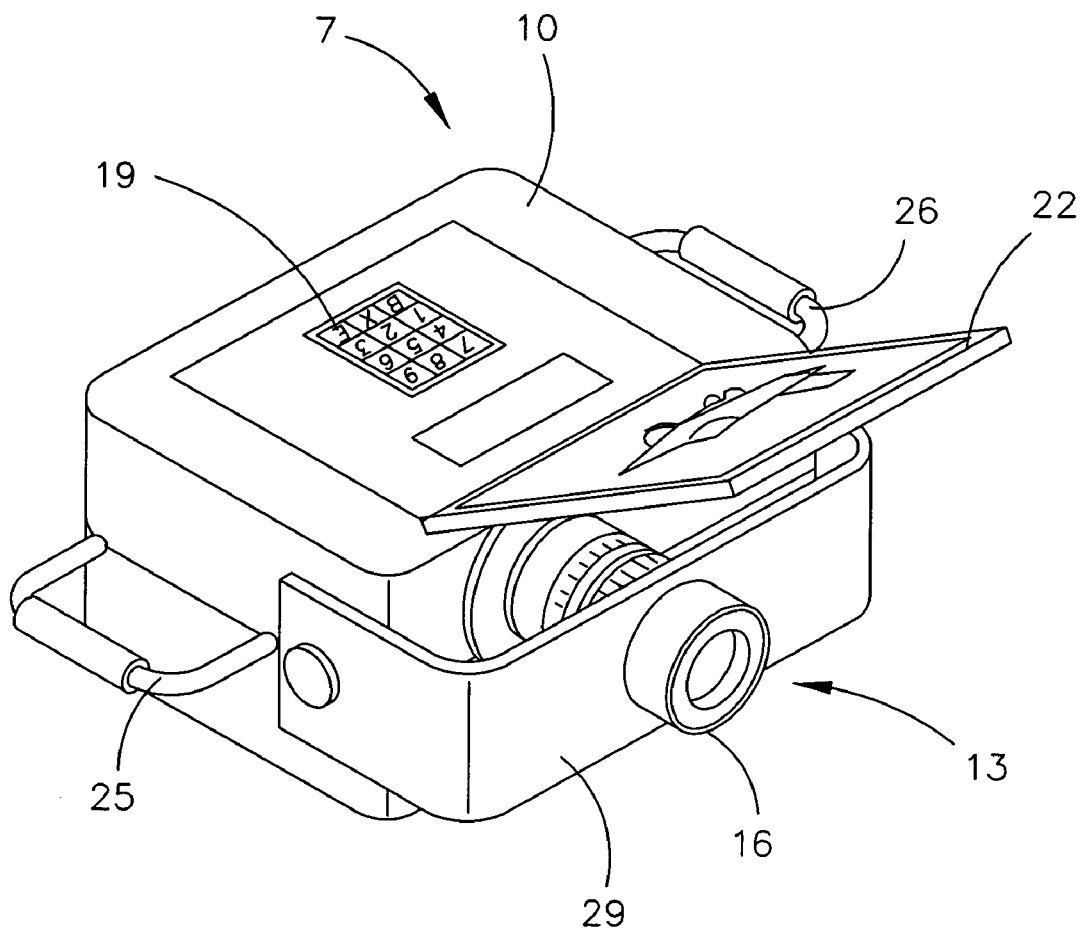
FIG. 1 shows an isometric view of a detector in accordance with one embodiment of the present invention.

Referring to the drawings, FIG. 1 shows a depiction of a detector, indicated generally as 7, according to the present invention. The detector 7 is compact, man-portable, and usable in an operational military environment by military personnel. Detector 7 has a case 10 that includes an infrared camera portion 13 having an optics portion 16. Detector 7 also includes a user interface portion 19 and a display portion 22. In some embodiments, detector 7 may also include handles 25, 26 and a camera optics guard, such as 29. In a preferred embodiment, processing components for the system as taught herein are enclosed inside case 10. The algorithms taught herein may be installed on circuit boards within case 10.

Detector 7 uses two-color radiometric techniques to determine the emissivity and temperature images displaying the spatial distribution of temperature and emissivity for extended objects. The process of determining temperature and emissivity includes corrections for the atmospheric path through which the object is viewed and for the environmental radiance reflected off the object. In fact, the detector 7 is designed to allow for decoupling of the reflected and emitted radiation from the object and the direct solution for the emissivity. Detector 7 presents the user with a large field-of-view of both temperature and emissivity images on display portion 22. These images contain tens of thousand pixels each representing average equivalent blackbody temperatures and emissivities over some region of the object of interest.

The infrared camera portion 13 collects photons with its optical system and focuses those on a focal plane array sensor. The sensor elements convert the photons to electrons that are then converted through internal processing mechanisms into digital counts. The output of the camera 13 is then digital counts as a function of the scene to which the optics portion 16 is directed. Before the digital counts can be useful, however, two steps are required: uniformity correction of the focal plane array and radiometric calibration.

The focal plane array (sensor) is made up of many individual pixels that each collect radiation from a particular location in the scene. These pixels inherently do not respond the same. Hence, a uniform input into the optics portion 16 would present a grainy output on the display portion 22. This output is corrected by a software algorithm so that a uniform input results in a uniform output. This conversion is called a uniformity correction.

After the uniformity correction, the output from the camera portion 13 is uniform. However, this output is in digital counts. Digital counts are not useful for analysis because the relationship between the digital counts out and the photons into the optical portion 16 is unknown. The process of radiometric calibration relates the digital counts out to a useful measure of the photons in.

In the system taught herein, the non-uniformity correction and the radiometric calibration are performed in one step using a blackbody that emits radiance as a function of its temperature according to Planck's function. The temperature of the blackbody is determined and the blackbody is placed directly in front of the camera optics 16 to allow a known radiance to be collected by the camera 13. The digital counts output associated with such known radiance are recorded for a first temperature. The temperature of the blackbody is changed and the process is repeated for another known radiance. The digital counts associated with the second radiance are recorded. Based on these two associations of digital counts and radiance, a linear relationship between radiance and digital counts is computed, which is the calibration equation. A separate equation is calculated for each pixel in the focal plane array. It should be clear that the process of doing radiometric calibration in this fashion will provide not just a calibrated output but also a uniform output.

As explained above, the radiometric calibration calculated for each pixel is a linear relationship between radiance into the lens and digital counts out of the camera electronics. The linear relationship between digital counts and radiance is uniquely defined by its slope (or gain) and y-axis intercept (or offset). Once calibrated, the camera has a very stable gain. That is, the slope of the calibration line does not change significantly with time. Unfortunately, the intercept (or offset) does drift. To correct for the drift of the offset, a calibration lens cap is placed over the lens and the radiance is recorded. The lens cap has a known temperature and presents a uniform radiance through the optics to the focal plane array. This uniform radiance can then be used to correct the offset for drift.

The camera described herein is capable of measuring light with wavelengths from 3–5 microns. The two non-overlapping infrared bands used in the present invention are selected to optimize the choice within the capability of the camera. The infrared bands were selected to not use wavelengths of light in which the atmosphere is not transparent and to reduce the sensitivity to noise. Since there is a carbon dioxide absorption band from about 4.15 to 4.35 microns, that range is avoided. Furthermore, studies showed there is less sensitivity to noise in the 4.5 to 5 microns band. In a preferred embodiment, the bands are nominally 3–4.15 microns and 4.5–5 microns.

Figure 2:
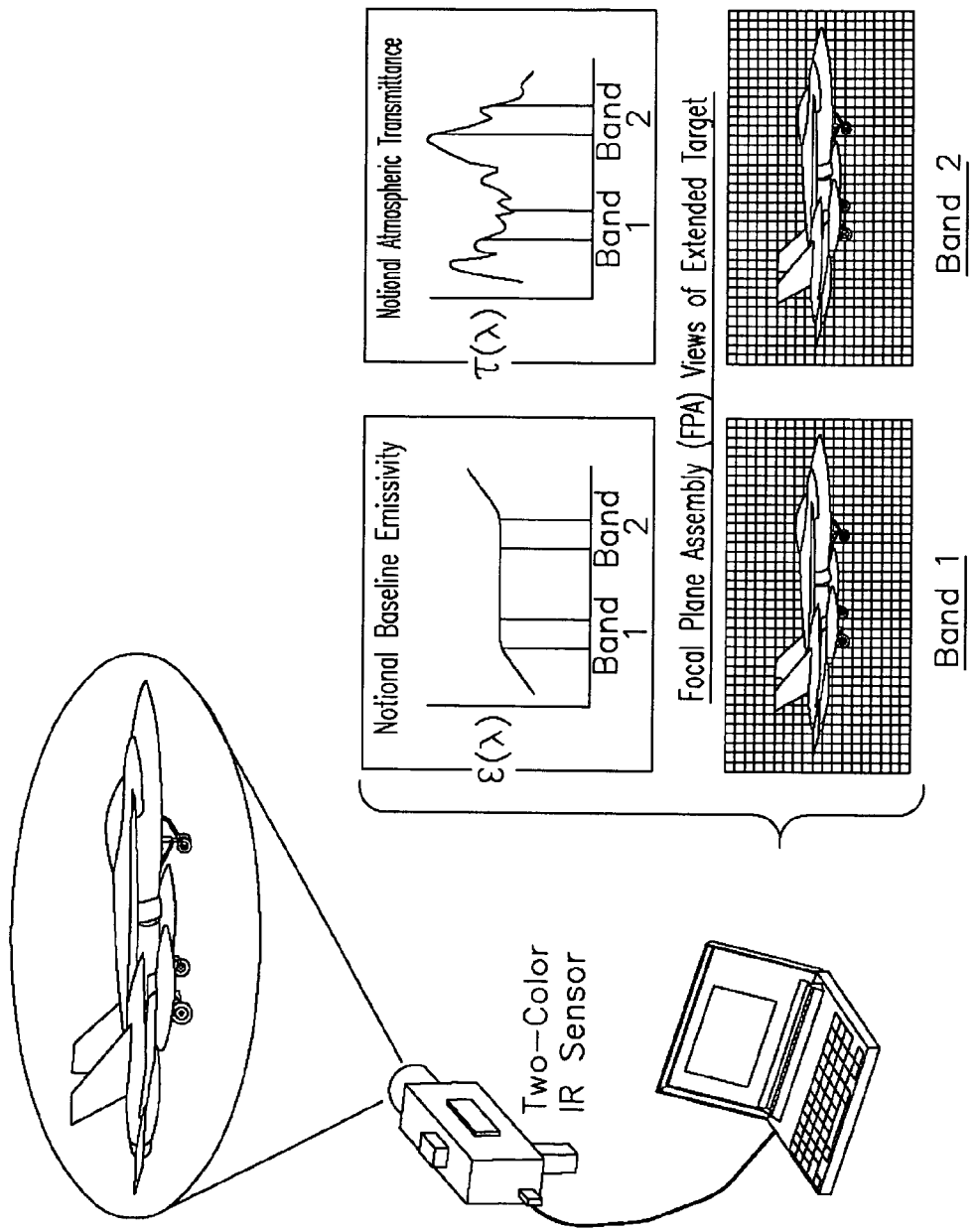
FIG. 2 shows features of the two-color measurement concept.
Figure 3:
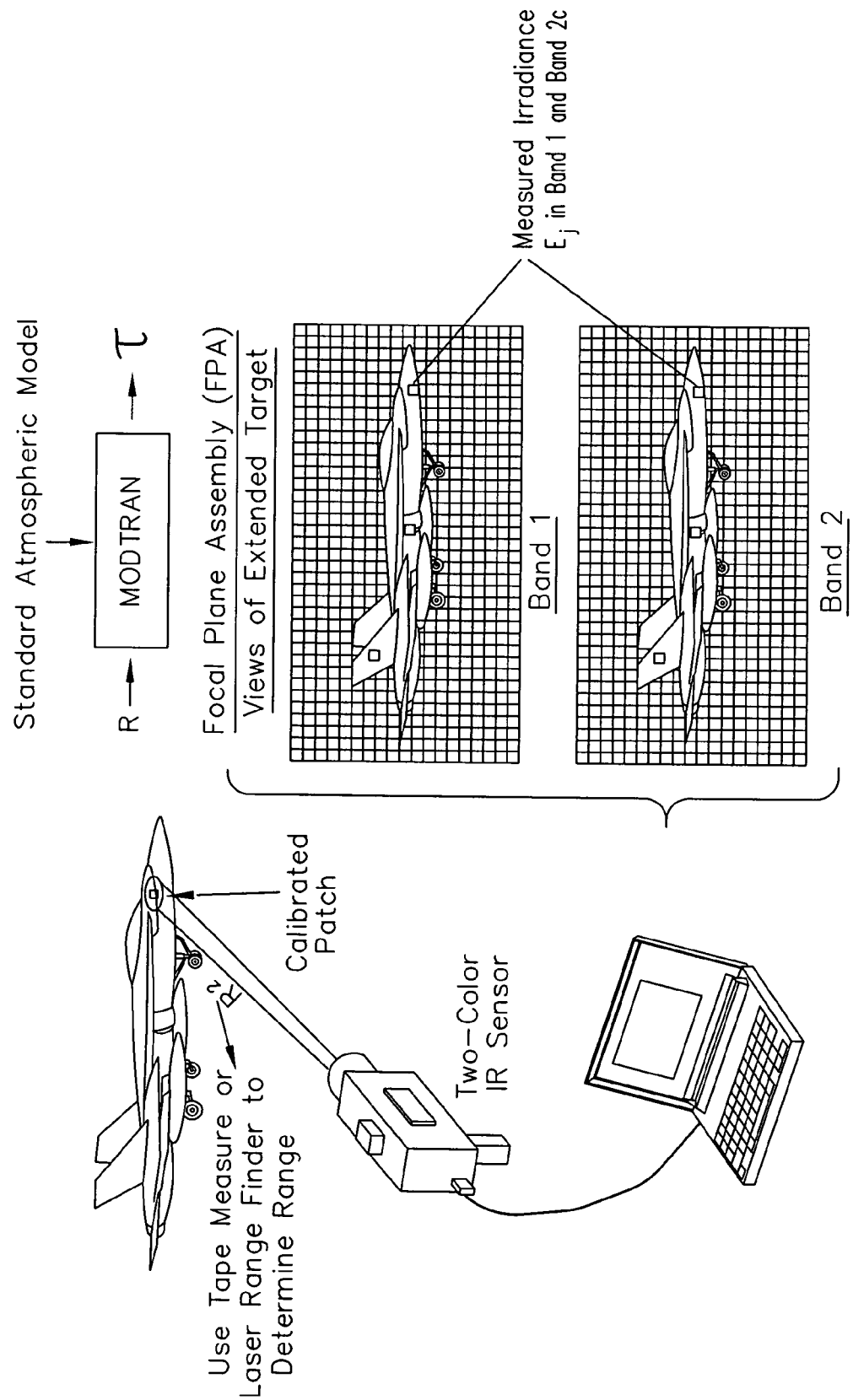
FIG. 3 shows features of the measurement concept using a calibrated patch.

FIGS. 2 and 3 show a depiction of the basic measurement concept of taking two calibrated infrared images of an object in selected infrared bands. While FIGS. 2 and 3 show the infrared sensor as a separate element from the processor, in a preferred embodiment, both elements would be enclosed in a single case 10. The images are corrected for atmospheric transmission, and then calculations are performed on the images to generate temperature and emissivity images. An integral part of the measurement concept according to the present invention is the correction for environmental radiation reflected off the target. This correction is done using a calibrated patch and a thermal probe. FIG. 3 shows the same object as FIG. 2 with a calibrated patch located on the nose of an aircraft in preparation for a radiometric measurement of the aircraft's nose section by the two-color infrared detector system as described herein. The calibrated patch attached to the surface of the aircraft will be in the field of view of each image taken and processed by the system. The calibrated patch has known emissivity and reflectance. The temperature of the patch is measured with a thermal probe at the time of the measurement.

Figure 4:
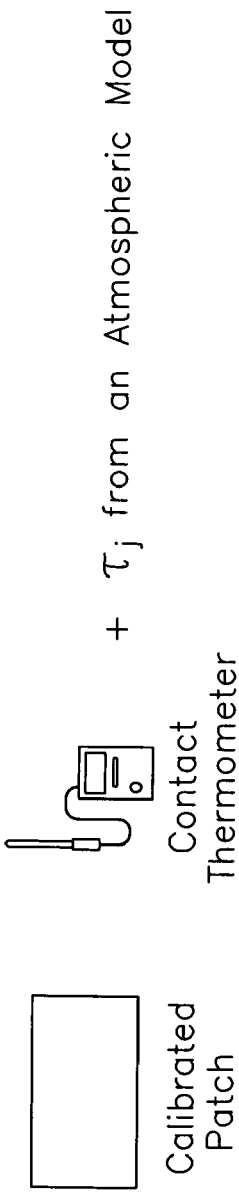
FIG. 4 illustrates the calculations to determine environmental radiance in accordance with one embodiment of the present invention.

The atmospheric transmission correction is performed based on a standard atmospheric model (MODTRAN). A user selects the type of atmospheric model to be used from a menu, such as tropical summer or artic winter, depending on the location. The user also inputs the range from the detector to the object of interest. Range (R) can be determined by measuring using a tape measure or other appropriate range finder. The correction for atmospheric transmission is applied separately in each band as shown by the equations in FIG. 4.

The correction for the environmental radiation reflected off the object in each band relies on the calibrated patch. Since the emissivity and reflectivity of the calibrated patch is known and the temperature of the calibrated patch can be determined, the environmental radiance in the vicinity of the calibrated patch can be calculated. Once the incident environmental radiance is determined based on measurements of the calibrated patch, this environmental radiation is then used to correct the measurements in the rest of the scene.

Figure 5:
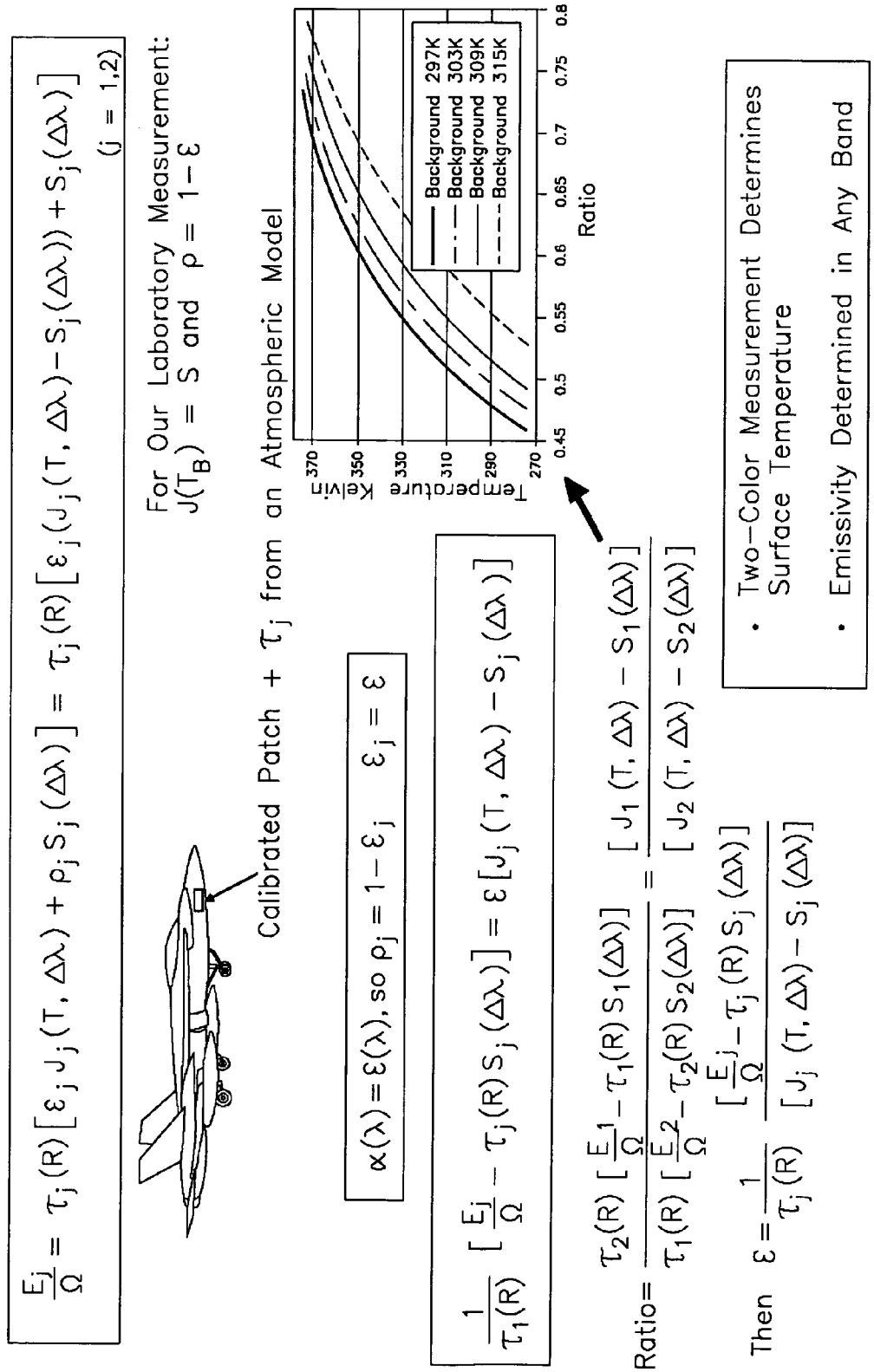
FIG. 5 illustrates the calculations to determine surface temperature and emissivity in accordance with one embodiment of the present invention.

FIG. 5 illustrates the equations for measuring temperature and emissivity using two-color thermometry by decoupling reflected and emitted radiation. As described above, the environmental radiance incident on the object is measured using the calibrated patch. The software algorithms then are able to manipulate the measurement equations from the two bands to solve for the objects temperature. Based on the temperature and the incident environmental radiance the emissivity of the object can then be computed.

Figure 6:
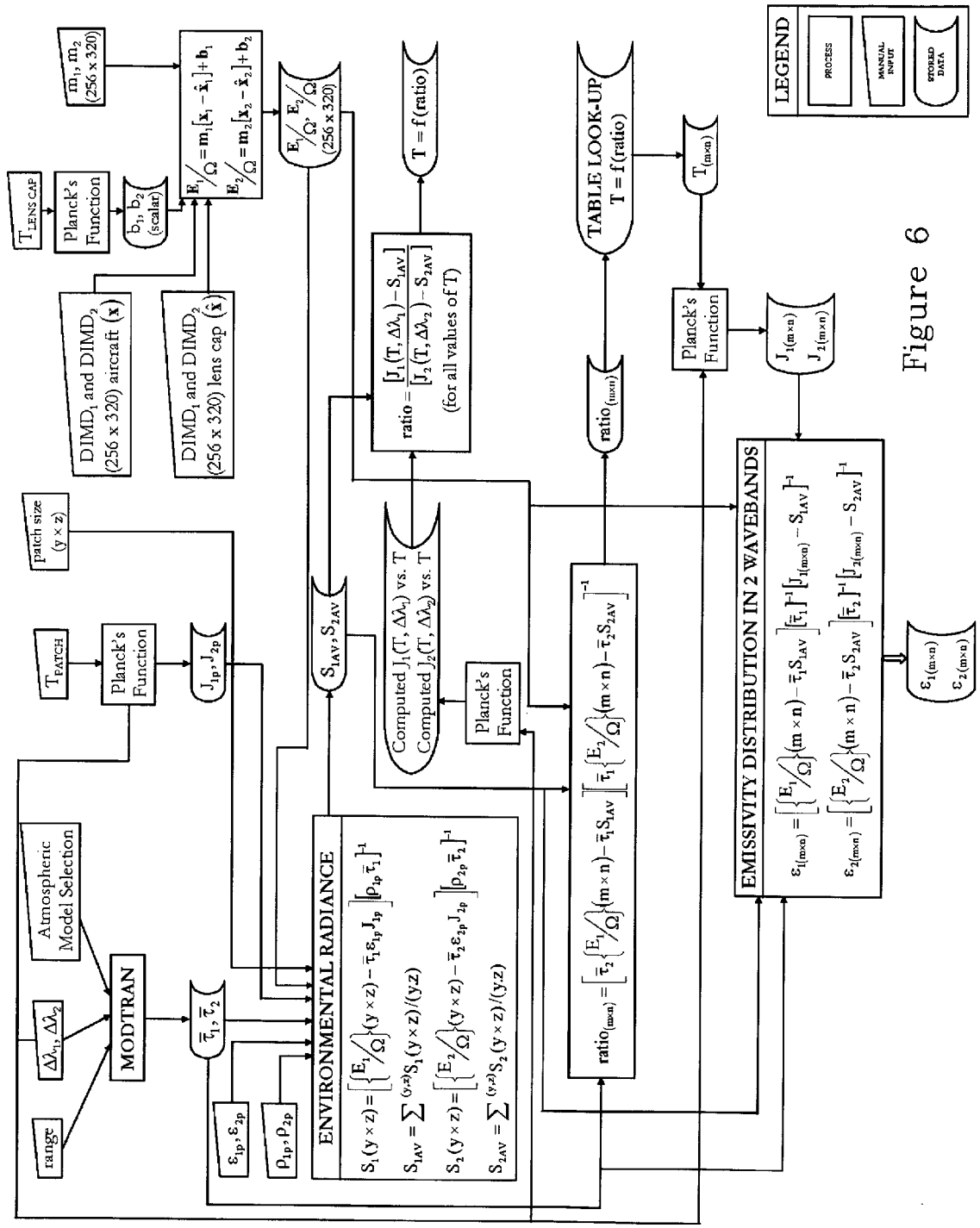
FIG. 6 is a flowchart of the software functions in accordance with one embodiment of the present invention.

FIG. 6 is a flow diagram of the algorithms used to calculate the temperature and emissivity images. The Algorithm Flow Chart gives an overview of the software used in calculating the temperature and emissivity of the unknown object. The process starts with a number of inputs and pre-calculated functions. The inputs are:

Range: distance from the camera to the object being measured

Atmospheric model selection: Pick a standard MODTRAN model (Arctic summer for example)

$T_{patch}$: Calibrated patch temperature as measured by a thermal probe $\Delta\lambda_1$ and $\Delta\lambda_2$: Wavebands of the two camera spectral filters Patch size (y×z): Number of pixels being averaged for the measurement of the background environment $T_{lenscap}$: Measured lens cap temperature $\epsilon_{lenscap}$: Pre-measured and calibrated lens cap emissivity $m_1$ and $m_2$: Arrays of radiometric gains in the lower and upper bands as determined during the laboratory calibration $\epsilon_1$ and $\epsilon_2$: Known emissivities of calibrated patch in the two wavebands $\rho_1$ and $\rho_2$: Known reflectivities of the calibrated patch The definitions of the quantities in the calculations are:

T=f(ratio): Temperature versus ratio lookup table $\tau_1$ and $\tau_2$: Average atmospheric transmission from the MODTRAN atmospheric model $J_{1p}$ and $J_{2p}$: Emitted radiance from the calibrated patches as calculated from Planck's function $DIMD_1$ and $DIMD_2$ ($x_1$ and $x_2$): Two arrays of digital counts output by the camera's focal plane array in two successive frames (one for each band) during the actual object measurement $DIMD_1$ and $DIMD_2$ ($\hat{x}_1$ and $\hat{x}_2$): Two arrays of digital counts output by the camera's focal plane array in two successive frames (one for each band) during the lens cap measurement.

$b_1$ and $b_2$: Radiance calibration offset correction calculated from the lens cap measurement $E_1/\Omega$ and $E_2/\Omega$: Arrays of radiance in each band as calculated from the calibration and the measurement $S_1(y\times z)$ and $S_2(y\times z)$: Arrays of calculated environmental radiance in the two bands $S_{1av}$ and $S_{2av}$: Average environmental radiance in the two bands $J_1$ and $J_2$: Calculated radiance (from Planck's function) in the two bands T: Temperature in Kelvin $\Delta\lambda_1$ and $\Delta\lambda_2$: Wavebands 1 and 2

$ratio_{m\times n}$: Array of ratios measured for each pixel in each band $T_{m\times n}$: Array of temperatures calculated based on the measurement $\epsilon_1$ and $\epsilon_2$ (m×n): Array of emissivities output as a result of the measurement and calculations (one array for each band)

The software receives the external inputs as described above as either imbedded data or as data that is keyed in by a user. Based on these inputs, corrections for the atmospheric transmission are tabulated and made ready for use in the environmental radiance and ratio calculations. In addition, calibration tables for each pixel in each band are prepared. A measurement starts with a lens cap measurement to prepare an array of offset corrections for use in the calibration. Once this is complete, the calibration tables are ready for use. The calibrated patch is then positioned on the object of interest and the camera measures a region of the object that includes the calibrated patch. The calibrated patch measurements are input to the environmental radiance calculation. All measurements are also sent into the ratio measurement and emissivity calculation.

The first step is to use the known properties of the calibrated patch and the measured measurements to calculate the average background radiance. This is then sent into the ratio table calculation for setting up the ratio table, the ratio measurement calculation, and the emissivity calculation function. The measured ratio is then matched with a value in the ratio lookup table to obtain the measured temperature of each point in the array. This temperature measurement is then sent to calculate the emissivity. Finally, the emissivities in each band are computed for the entire array. Two color radiometric techniques have the advantage of being able to measure temperature of a greybody object optically without prior knowledge of the object's emissivity. This is a very powerful approach to optical thermometry.

As shown above, the system forms ratios of the measured radiances in each band (corrected for environment reflections). These ratios of corrected radiances are independent of unknown object emissivity and enable determination of the temperature of the object of interest from calculated lookup tables. Once the temperature is calculated, it can be used with the other measurements to calculate the surface emissivity.

Figure 7:
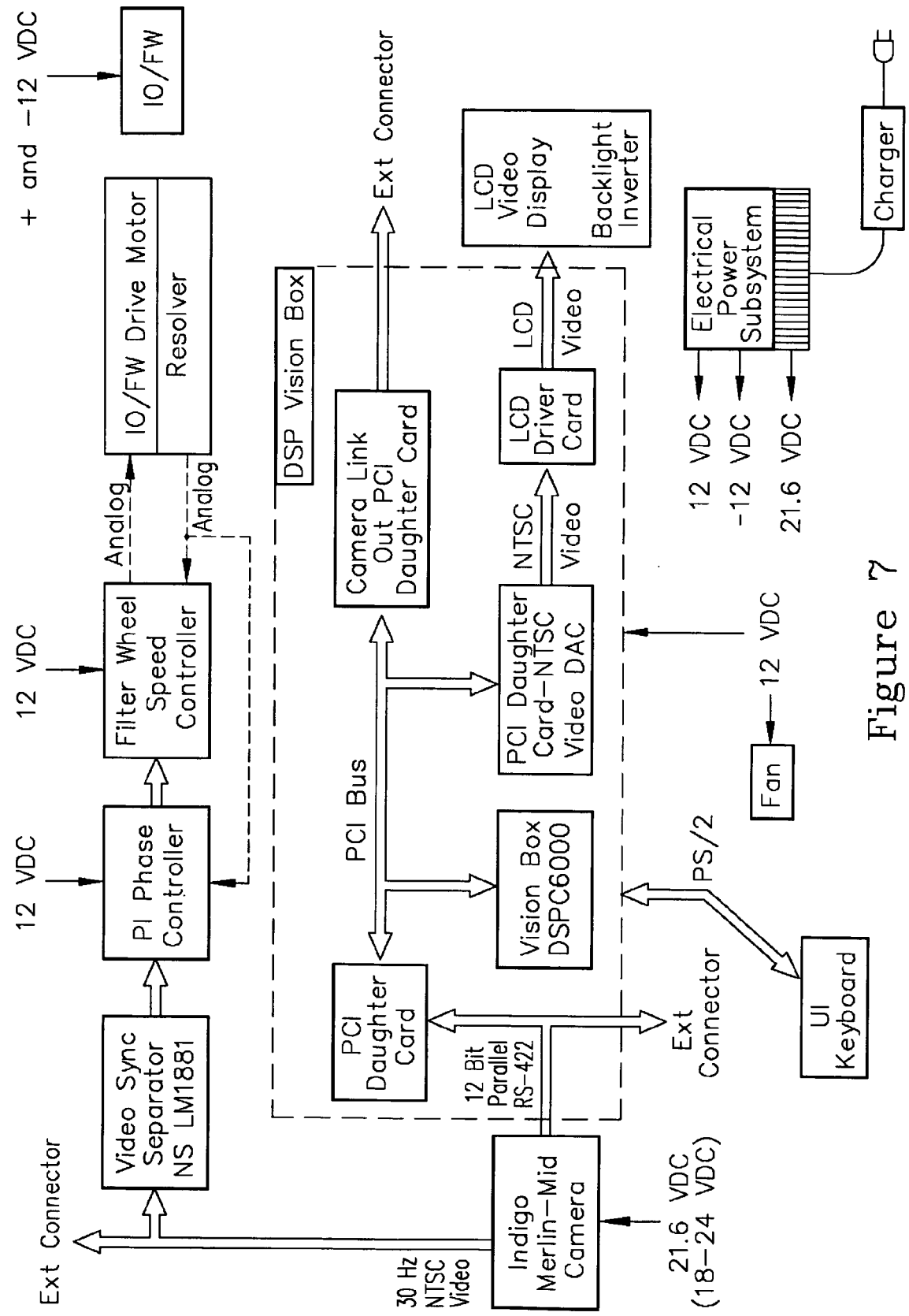
FIG. 7 is a functional block diagram of the system according to one embodiment of the present invention.
Figure 8:
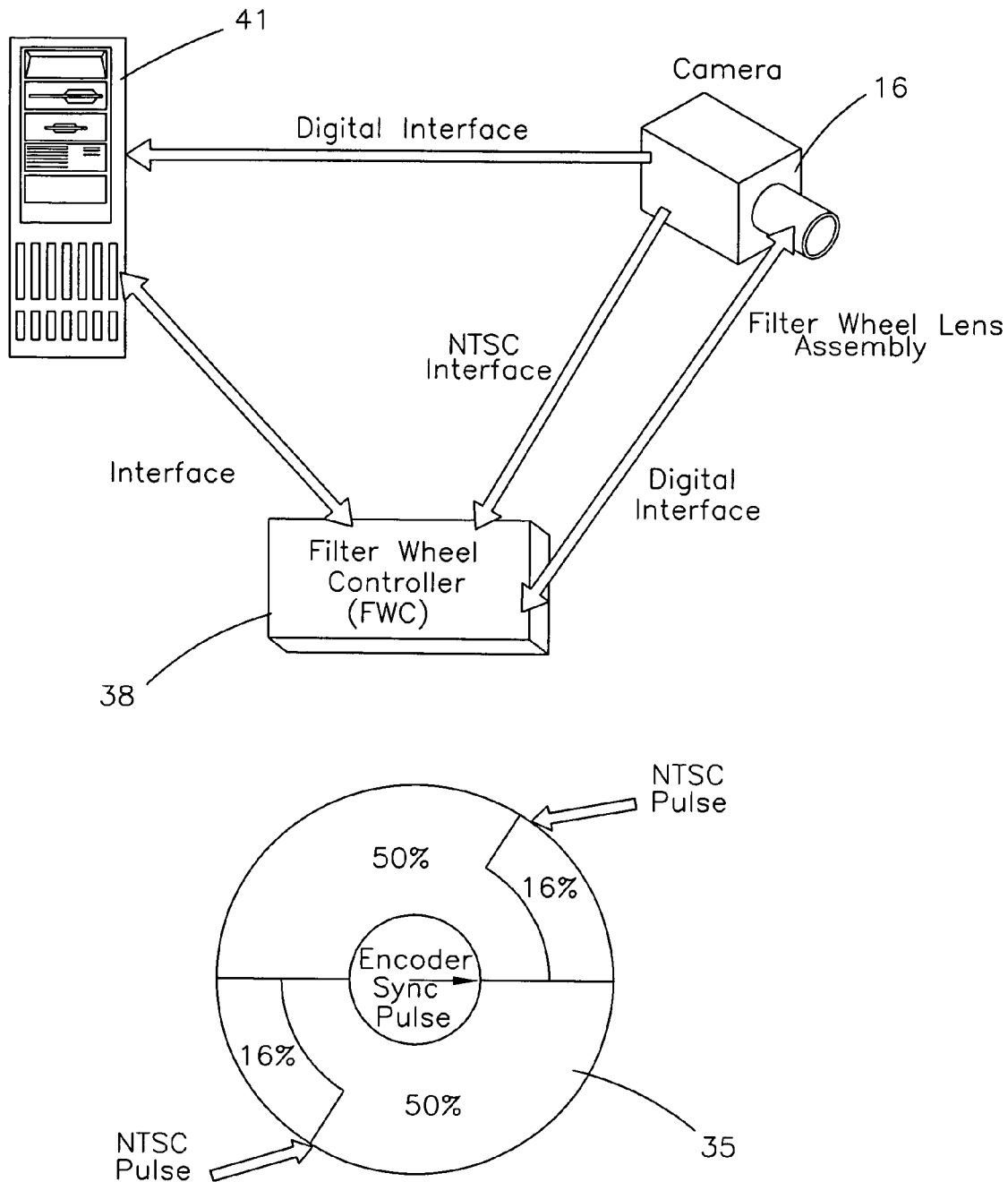
FIG. 8 shows a filter wheel interface according to one embodiment of the present invention.

FIG. 7 shows the functional block diagram for the system. In one embodiment, the camera is a 3–5 micron infrared imager with a 256×320 pixel focal plane array (FPA). The camera collects images at a 30 Hz rate. The optical system uses a lens with a rotating spectral filter 35 (FIG. 8). Half of this circular filter passes radiation in the 3.0–4.15 micron band and the other half passes in the 4.5–5 micron band. The filter must be rotated at a rate such that alternate frames collected by the camera 13 are in different bands. That is, out of 30 frames, 15 are in one band and 15 in another and every other frame is in a different band. A motor and controller 38 is used to rotate the filter at the correct speed and insure it is properly positioned. This controller 38 is driven by a video synchronization signal from the camera. The output of the camera goes into the processor 41 to do the computations described in the algorithm flow diagram. The processor 41 receives inputs from the user interface portion 19 and outputs to the display portion 22. In some embodiments, the display portion 22 may be an LCD video display. Additionally, in some embodiments, the video display may be saved to an external permanent storage medium. The system is powered by batteries and the electronics cooled by a fan.

Figure 9:
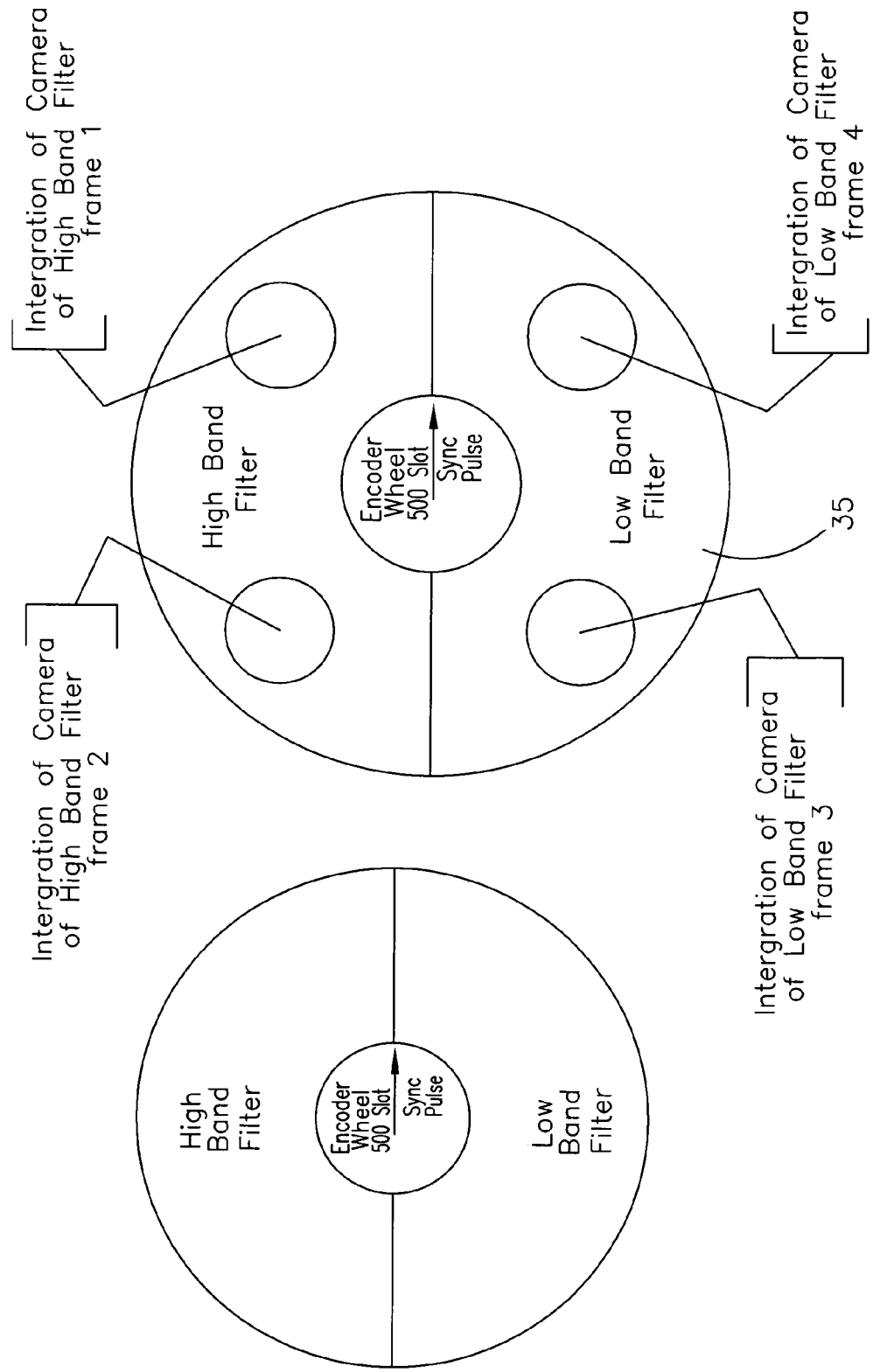
FIG. 9 illustrates features of the filter wheel of FIG. 8.

FIG. 9 shows the camera and integrated optics and filter wheel. The custom rotating filter wheel is designed to alternate images between the 3–4.15 (lower) band and the 4.5–5 micron (upper band). The filter wheel transmits only in the lower band on one side and only in the higher band on the other. Its rotation rate and position is synced with the frame rate of the camera. Thus, a camera collecting images at 30 frames per second as is standard would collect 15 images in our lower band and 15 images in our upper band per second. These images are of course alternated. In order to monitor the position and rate of rotation of the filter wheel, a number of markings are placed on the wheel. A sensor is used to locate these marks and a controller operates the motor in a fashion such that the images alternate between the two bands.

Figure 10:
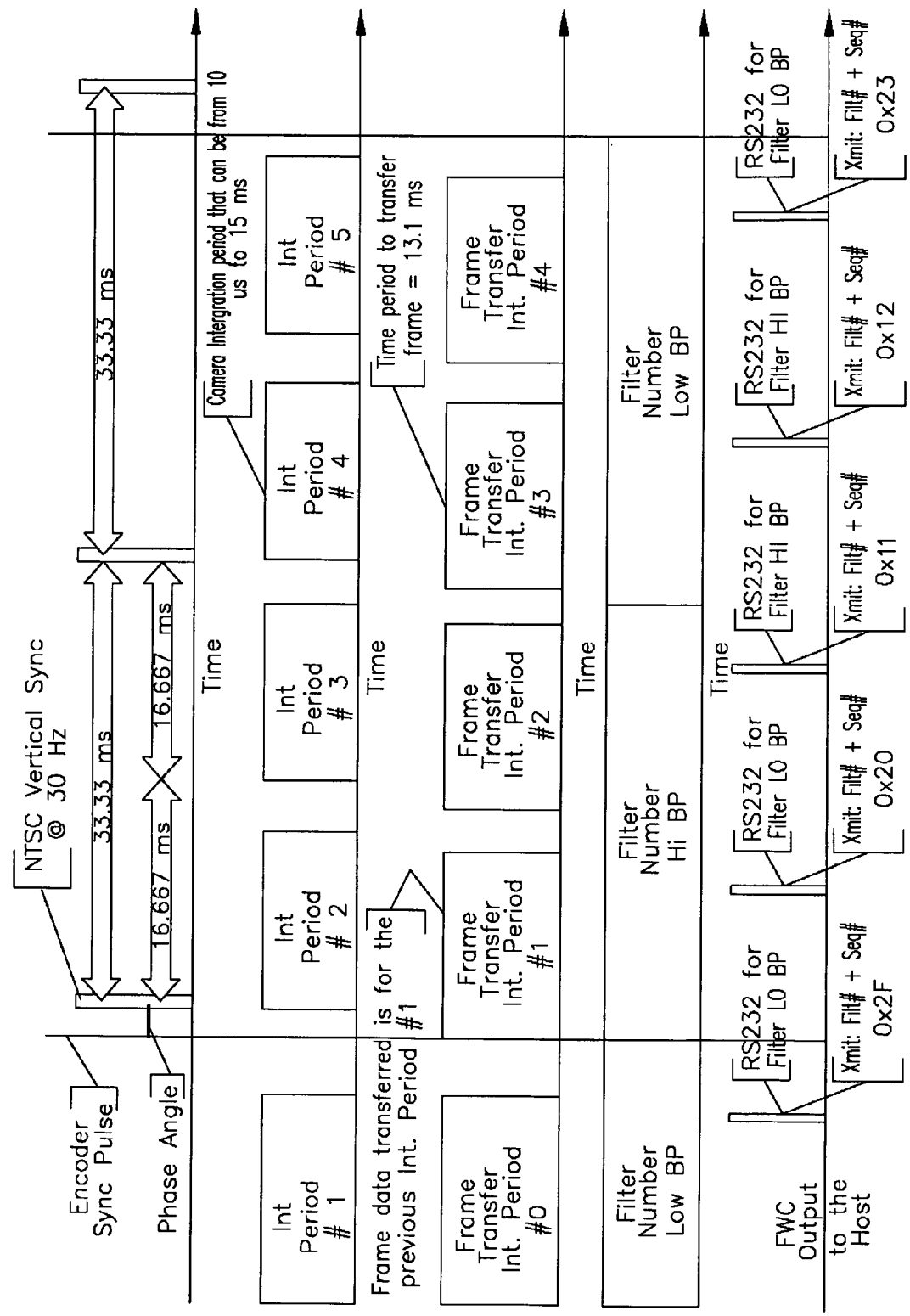
FIG. 10 shows the timing sequence for a filter wheel of FIG. 8 according to one embodiment of the present invention.

FIG. 10 illustrates the filter wheel 35 and camera synchronization sequence. On startup, the filter wheel controller 38 initially drives the filter wheel 25 at approximately 900 RPM. The camera 13 sends digital images to the processor 41 at 60 Hz. The camera 13 also sends a synchronous 30 Hz signal to the filter wheel controller 38. The sensor in the camera optics 16 sends an identification pulse to the controller 38 based on the position of the filter wheel 35. The filter wheel controller 38 adjusts the rotational speed of the filter wheel motor to correctly align the phase angle of the filter wheel 35 relative to the camera frames. The filter wheel controller also sends filter wheel position data to the processor 41.

Besides the main purpose of the present invention, which is to sense the temperature of an image and then compute the emissivity distribution, it is also possible for this instrument to be used purely for calculating the temperature of an object. In cases where the emissivity is unknown but locally constant or in which it varies over the scene, this will be a powerful tool. That is, standard thermal optical radiometry measures temperature in cases where the emissivity is known. However, the present invention enables the capability to measure the temperature optically in cases where the emissivity is not known and varies over the scene. In an alternate embodiment, the integrated optics and filter wheel can be replaced with an inherent two-color infrared sensor. In a further alternate embodiment, an infrared sensor with two (or more) separate optical trains may be used. Each optical train would focus energy from the image in each band on one-half the focal plane array. Another alternate embodiment uses a hyperspectral imager. In some bands (such as the visible), it is reasonable to use two independent sensors each with an appropriate spectral filter rather then one sensor with a rotating filter.

It is also important to emphasize that the spectral band to be used in any implementation of the system is a variable that is optimized depending on the temperature and emissivities to be measured and the measurement environment. Examples include the possibility of dropping into the visible or near infrared band to measure very hot objects or pushing out into the long wave infrared band to measure cooler objects. Again, the process of optimizing the filters and measurement device is a novel element in this technology.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. An emissivity detector comprising:
an infrared camera comprising:
(1) a lens;
(2) a plurality of infrared sensitive detector elements arranged as a two-dimensional array; and
(3) means for alternating the band of wavelength of infrared signals incident upon said detector elements;
a processing circuit, including a memory having a plurality of atmospheric models for selection stored therein, said atmospheric models being used to correct the atmospheric transmission path of infrared signals from an object of interest to said camera, said processing circuit being adapted to compute emissivity of said object of interest; and
a screen that is arranged to display an image representing said emissivity of said object of interest.

2. The emissivity detector of claim 1, wherein said band of wavelengths alternates between 3–4.15 microns and 4.5–5microns.

3. The emissivity detector of claim 1, further comprising:
a filter wheel wherein one-half of said filter wheel passes radiation in a first infrared wavelength band and one-half of said filter wheel passes radiation in a second infrared wavelength band.

4. The emissivity detector of claim 3, further comprising:
means for rotating said filter wheel in front of said lens in synchronization with the frame speed of said camera.

5. The emissivity detector of claim 1, wherein correction for the atmospheric transmission path is performed in each wavelength band.

6. The emissivity detector of claim 1, said processing circuit further comprising:
software including equations to correct for environmental radiation reflected off said object of interest and to calculate the temperature profile of said object of interest.

7. The emissivity detector of claim 6, wherein said processing circuit further computes the emissivity of the object of interest based on the temperature and the environmental radiance.

8. The emissivity detector of claim 1, further comprising:
a user interface wherein a user can input data to said processing circuit.

9. The emissivity detector of claim 8, wherein said user interface enables input of a selected atmospheric model.

10. The emissivity detector of claim 8, wherein said user interface enables input of the range between said detector and said object of interest.

11. A method for measuring emissivity and temperature of an object, comprising:
providing a detector that receives energy in a plurality of wavelengths;
providing a patch, adjacent to said object and in the field of view of said detector, wherein said patch has a known emissivity;
determining the temperature of the patch;
measuring the range between the patch and said detector;
correcting the received energy for the atmospheric path along the range from the patch to the detector;
decoupling reflected radiation from the radiation emitted by the object; and
calculating the temperature of the object.

12. The method of claim 11, further comprising:
calculating the emissivity of the object based on said calculated temperature.

13. The method of claim 11, wherein said detector receives energy in two alternating infrared wavelength bands.

14. The method of claim 13, wherein said two infrared wavelength bands are 3–4.15 microns and 4.5–5 microns.

15. The method of claim 11, wherein the step of correcting the received energy of the atmospheric path includes selecting an atmospheric model based on the location of the object.

16. An integrated device for determining emissivity and temperature distributions of an object from two successively or simultaneously obtained radiometrically calibrated infrared images of a static scene, said device comprising:
an infrared camera capable of detecting and transmitting digital data representing two or more images of a scene;
means of rapidly collecting two successive frames of infrared radiance data in two or more separate infrared wavelength bands;
a calibrated patch with embedded temperature measurement and known emissivity, placed in the field-of-view of the infrared camera;
a digital computing device with embedded software processes to read and store successive infrared radiance scenes of the object and the calibrated patch, compute a background component of radiation reflected from the patch and subtract it from the object radiance as a source of error to be removed, and then iteratively compute the temperature and emissivity distributions of the object under measurement from the residual object radiance,
said iterative computation process consisting of differentially scaling total scene radiance
until the emissivity computed for the calibrated patch closely matches its known value.

17. The integrated device of claim 16, said means of rapidly collecting two successive frames of infrared radiance data in two or more separate infrared wavelength bands further comprising:
a filter wheel assembly mounted within the optical path to the infrared camera, and controlled to rotate in such a way that each successive image frame is subjected to bandpass filtering into one of two or more different wavelength bands.

18. The integrated device of claim 16, said means of rapidly collecting two successive frames of infrared radiance data in two or more separate infrared wavelength bands further comprising:
a focal plane array capable of measuring infrared radiance in two separate wavebands serially or simultaneously.

19. The integrated device of claim 16, said digital computing device further comprising software processes to correct the received energy for the atmospheric path along the range from said patch to said camera based on an atmospheric model associated with the location of the object.

20. The integrated device of claim 16, said digital computing device further comprising software processes to decouple environmental radiation reflected off said object from the radiation emitted by the object.

* * * * *